United States Patent
Golgiri et al.

(10) Patent No.: US 11,724,719 B2
(45) Date of Patent: Aug. 15, 2023

(54) EMPLOYING WI-FI COMMUNICATIONS TO ACTIVATE AN OPERATION OF AN AUTONOMOUS VEHICLE AT A SCHEDULED TIME

(71) Applicant: Ford Global Technologies, LLC, Dearborn, MI (US)

(72) Inventors: Hamid M. Golgiri, Livonia, MI (US); Yangho Kim, Northville, MI (US); Luke Niewiadomski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 17/115,148

(22) Filed: Dec. 8, 2020

(65) Prior Publication Data

US 2022/0176999 A1 Jun. 9, 2022

(51) Int. Cl.
*B60W 60/00* (2020.01)
*G05D 1/00* (2006.01)
*H04W 4/40* (2018.01)

(52) U.S. Cl.
CPC ....... *B60W 60/0023* (2020.02); *G05D 1/0005* (2013.01); *G05D 1/0022* (2013.01); *H04W 4/40* (2018.02); *B60W 2556/45* (2020.02)

(58) Field of Classification Search
CPC ......... B60W 60/0023; B60W 2556/45; H04W 4/40; G05D 1/0005; G05D 1/0022
See application file for complete search history.

(56) References Cited

U.S. PATENT DOCUMENTS 9,377,315 B2 * 6/2016 Grover ................. G01C 21/34
9,781,750 B2 * 10/2017 Kephart, Jr. .......... H04W 88/10
(Continued)

FOREIGN PATENT DOCUMENTS

CN 101605332 B * 2/2013
WO WO-2017127787 A1 * 7/2017 ............... G06F 1/28

OTHER PUBLICATIONS

English translation of CN-101605332-B (Year: 2013).*
(Continued)

*Primary Examiner* — Anshul Sood
*Assistant Examiner* — Matthew Ho
(74) *Attorney, Agent, or Firm* — Brandon Hicks; Eversheds Sutherland (US) LLP (57) ABSTRACT

The disclosure generally pertains to minimizing battery power consumption while employing local wireless communication to activate an operation of an autonomous vehicle. In an example implementation, a vehicle controller of an autonomous vehicle transitions to a powered-down state after the autonomous vehicle is parked at a parking spot that lacks cellular communication coverage. The vehicle controller may transition to a powered-up state at a scheduled time to execute an autonomous operation based on a directive stored in a cloud-based device. In no directive has been stored, the vehicle controller wakes up periodically in a partially powered-up state and transmits a query in a local wireless communications format to the cloud-based device to check for a directive. If no directive is present, the vehicle controller transitions back to the powered-down state. If a directive is present, the vehicle controller transitions to a fully powered-up state to execute the autonomous operation.

20 Claims, 5 Drawing Sheets

(56) References Cited

U.S. PATENT DOCUMENTS

| | | | |
|---|---|---|---|
| 10,370,005 B2 | 8/2019 | Van Wiemeersch et al. | |
| 2007/0093943 A1* | 4/2007 | Nelson | G07C 9/00309 |
| | | | 701/2 |
| 2012/0243528 A1* | 9/2012 | Frye | H04W 56/00 |
| | | | 455/39 |
| 2017/0302774 A1* | 10/2017 | Lei | H04W 48/16 |
| 2019/0037499 A1* | 1/2019 | Son | G08G 1/096791 |

OTHER PUBLICATIONS

J. Cynthia et al, "IOT based Smart Parking Management System", International Journal of Recent Technology and Engineering (IJRTE), ISSN: 2277-3878, vol. 7, Issue 45, Nov. 2018, 6 pages.
Bosch Global, "Automated Valet Parking", Robert Bosch GmbH, 2020, 6 pages.

\* cited by examiner

EMPLOYING WI-FI COMMUNICATIONS TO ACTIVATE AN OPERATION OF AN AUTONOMOUS VEHICLE AT A SCHEDULED TIME

BACKGROUND

Advances in automotive design are constantly introducing more and more driver assistance features into vehicles. Some of these features, such as cruise control and anti-lock braking system (ABS), have been around for many years. Some other features, such as brake assist and lane deviation warning systems, have been introduced subsequently. With the advent of autonomous vehicles, many driving tasks have now been automated, including tasks such as self-driving on roads, self-parking, remote start, and summons. An individual may nowadays enter a directive into a smartphone to instruct an autonomous vehicle to park in a garage without human assistance and another directive to instruct the autonomous vehicle to start up and travel from the garage to a spot located some distance away from the garage in order to pick up the individual.

Such directives are typically transmitted via a cellular communications network from a smartphone of the individual to a computer in the autonomous vehicle. However, cellular communications coverage may be poor or non-existent in some places, such as, for example, inside a building, and directives entered into the smartphone may be unable to reach the computer in the autonomous vehicle. The lack of cellular communications coverage can thus pose an issue in such places.

Another issue relates to power consumption by electronic components contained in the computer that receives the directives in the autonomous vehicle. The power drain on the battery of the vehicle can be problematic, especially if the vehicle is left parked and unattended for a significant period of time (such as at an airport).

It is therefore desirable to provide solutions that at least address issues related to conveying commands to an autonomous vehicle in areas where cellular coverage is poor or non-existent, and also issues related to battery power drain in such parked vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is directed to systems and methods to minimize battery power consumption in an autonomous vehicle while employing communications in a local wireless communication format to communicate with a cloud-based device and obtain a directive for initiating an operation by the autonomous vehicle. An individual may operate a user device (a smartphone, for example) to convey the directive to the autonomous vehicle via the cloud-based device. The directive may instruct the autonomous vehicle to perform various operations, such as, for example, a remote start operation, a remote vehicle door lock operation, or a remote summons operation. In an example implementation in accordance with the disclosure, a vehicle controller of an autonomous vehicle transitions to a powered-down state after the autonomous vehicle is parked in a parking spot that lacks cellular communication coverage. The vehicle controller may transition to a powered-up state at a scheduled time to execute an autonomous operation in accordance with a directive stored in a cloud-based device. In no directive has been stored, the vehicle controller wakes up periodically to a partially powered-up state and transmits a query in a local wireless communication format to the cloud-based device to check for the presence of a directive to execute an autonomous operation. If no directive is present, the vehicle controller transitions back to the powered-down state. If a directive is present, the vehicle controller transitions to a fully powered-up state to execute the autonomous operation. Transitioning to the powered-down state after the autonomous vehicle is parked in the parking spot may involve the vehicle controller performing actions such as, for example, placing a Wi-Fi communications system and a cellular communications system in the powered-down state. Transitioning to the partially powered-up state may involve the vehicle controller performing actions such as powering up the Wi-Fi communications system, which is one example system employing a local wireless communication format) and retaining the cellular communications system in the powered-down state, thereby conserving battery charge in a battery of the autonomous vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature.

Furthermore, certain words and phrases that are used herein should be interpreted as referring to various objects and actions that are generally understood in various forms and equivalencies by persons of ordinary skill in the art. For example, the phrase "user device" as used herein is applicable to any device that a person may use to run software that performs various operations in accordance with the disclosure. The word "vehicle" as used in this disclosure can pertain to any of various types of vehicles such as cars, vans, sports utility vehicles, trucks, electric vehicles, gasoline vehicles, and hybrid vehicles. The phrase "autonomous vehicle" as used in this disclosure generally refers to a vehicle that can perform at least a few operations without human intervention. At least some of the described embodiments are applicable to Level 5 vehicles, and may be applicable, in some scenarios, to lower level vehicles as well. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation. The phrase "software application" as used herein with respect to a user device such as a smartphone, refers to various types of code (firmware, software, machine code etc.) installed in the user device. The phrase "key off condition" as used in general parlance refers to a condition where an ignition key of a vehicle has been removed from an ignition switch. This phrase is now generally extended to all types of vehicles when the engine/motor of the vehicle has been shut down (including vehicles that are started by depressing a push button). The phrase "key off load" typically refers to an amount of charge drawn from a battery of a vehicle that is in a key off condition. It should be understood that the word "example" as used herein is intended to be non-exclusionary and non-limiting in nature.

Figure 1:
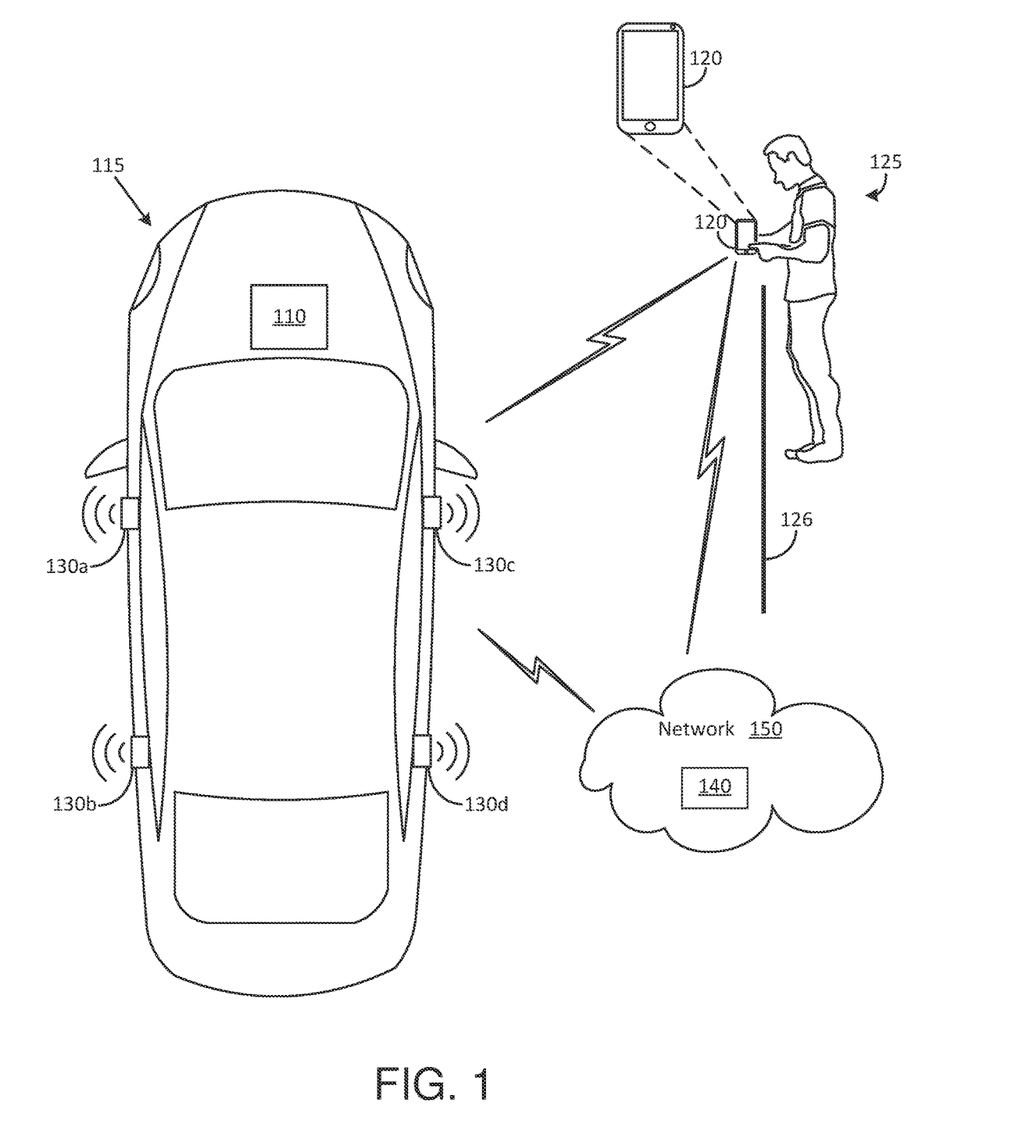
FIG. 1 illustrates an example autonomous vehicle that can be controlled via directives entered into a user device by an individual who is located outside the autonomous vehicle.

FIG. 1 illustrates an example autonomous vehicle 115 that can be controlled via directives entered into a user device 120 by an individual 125 who is located outside the autonomous vehicle 115. The autonomous vehicle 115 may include various components such as, for example, a vehicle controller 110 and a wireless communication system.

The user device 120 of the individual 125 may be any of various devices such as, for example, a smartphone, a smart wearable, a tablet computer, a laptop computer, and a desktop computer. In the illustrated example scenario, the user device 120 is a smartphone held by the individual 125 while standing outside the autonomous vehicle 115. In another example scenario, the user device 120 can be a laptop computer or a desktop computer that is operated by the individual 125 when the individual 125 is located inside a building, such as, for example, when seated in the lobby of a hotel, a room in a house, or in an airport terminal.

In general, the user device 120 can include a processor, a memory, and communication hardware. The memory, which is one example of a non-transitory computer-readable medium, may be used to store an operating system (OS) and various code modules such as, for example, a control application for controlling the autonomous vehicle 115. The code modules are provided in the form of computer-executable instructions that can be executed by the processor for performing various operations in accordance with the disclosure. The communication hardware can include one or more wireless transceivers, such as, for example, a cellular transceiver (when the user device 120 is a cellular phone) or a WiFi transceiver (when the user device 120 is a laptop computer, for example) that allows the user device 120 to transmit and/or receive various types of wireless signals to/from the autonomous vehicle 115. The communication hardware can also include hardware for communicatively coupling the user device 120 to the communications network 150 for carrying out communications and data transfers with the cloud-based device 140.

The vehicle controller 110 may perform various functions such as, for example, controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle controller 110 may also control various actions performed by the autonomous vehicle 115 such as, for example, traveling on a travel route towards a designated destination without human intervention, responding to a self-parking operation by traveling to a garage, locating a vacant parking spot, and parking in the vacant parking spot without human intervention, and responding to a summons directive by pulling out of a parking spot in a garage and traveling to a pickup location where the individual 125 may be waiting to get into the autonomous vehicle 115.

The wireless communication system can include a set of wireless communication nodes 130a, 130b, 130c, and 130d mounted upon the autonomous vehicle 115 in a manner that allows the vehicle controller 110 to communicate with devices such as the user device 120 carried by the individual 125. In an alternative implementation, a single wireless communication node may be mounted upon the roof of the autonomous vehicle 115. The wireless communication system may use one or more of various wireless technologies such as cellular (5G, for example), Wi-Fi, Bluetooth®, Ultra-Wideband (UWB), Zigbee®, Li-Fi (light-based communication), audible communication, ultrasonic communication, or near-field-communications (NFC), for carrying out wireless communications with devices such as the user device 120.

The vehicle controller 110 can also utilize the wireless communication system to communicate with a cloud-based device 140 (a server computer or a cloud storage element, for example) via a communications network 150. The communications network 150 may include any one network, or a combination of networks, such as a local area network (LAN), a wide area network (WAN), a telephone network, a cellular network, a wireless network, and/or private/public networks such as the Internet. For example, the communications network 150 may support communication technologies such as cellular, Wi-Fi, Wi-Fi direct, Bluetooth®, Ultra-Wideband, near-field communication (NFC), Li-Fi, machine-to-machine communication, and/or man-to-machine communication. At least one portion of the communications network 150 includes a wireless communication link that allows the cloud-based device 140 to communicate with one or more of the wireless communication nodes 130a, 130b, 130c, and 130d on the autonomous vehicle 115. The cloud-based device 140 may communicate with the vehicle controller 110 for various purposes such as, for example, to convey a directive received from the individual 125 via the user device 120. The directive can be any various actions to be carried out by the autonomous vehicle 115 such as, for example, a summons to pick up the individual 125 at a designated location. In an example implementation in accordance with the disclosure, the cloud-based device 140 may communicate with the vehicle controller 110 by exchanging message data packets formatted in a protocol such as, for example, a telematics protocol. Two examples of a telematics protocol include the Ford Telematics Communication Protocol (FTCP) and the Next-Generation Telematics Protocol (NGTP).

The user device 120 may communicate with the vehicle controller 110 via one or more of the first set of wireless communication nodes 130a, 130b, 130c, and 130d so as to allow the individual 125 (for example a driver who is outside the autonomous vehicle 115) to control the autonomous vehicle 115 from a remote location when performing operations in accordance with the disclosure.

In an example scenario in accordance with the disclosure, the individual 125 may be standing on a curb 126 at a roadway intersection and may execute a software application in the user device 120 to summon the autonomous vehicle 115 from a public parking spot located on a side street about a block away from where the individual 125 is standing. The individual 125 may opt to summon the autonomous vehicle 115 from the public parking spot to a pickup spot close to the roadway intersection. The individual 125 may track the progress of the autonomous vehicle 115 on the user device 120 as the autonomous vehicle 115 travels from the public parking spot to the pickup spot. The individual 125 may enter the autonomous vehicle 115 when the autonomous vehicle 115 stops at the pickup spot.

In another example scenario in accordance with the disclosure, the individual 125 may opt to issue a directive to the autonomous vehicle 115 to travel from the public parking spot to a driveway of a building, and can enter the autonomous vehicle 115 when the autonomous vehicle 115 stops on the driveway.

In yet another example scenario in accordance with the disclosure, the individual 125 may be standing near a door in front of a building (a hotel, for example) and may execute a software application in the user device 120 in order to summon the autonomous vehicle 115 from a parking garage located behind the building. The parking garage can be an open area in one case and a multistoried structure in another case. The autonomous vehicle 115 may be parked on any floor of the multistoried structure. The individual 125 may enter the autonomous vehicle 115 when the autonomous vehicle 115 travels to, and stops at, the pickup spot.

In yet another example scenario in accordance with the disclosure, the individual 125 may be in a room of a hotel after checking in overnight, and may execute a software application in the user device 120 to issue a directive to the autonomous vehicle 115 to move from a public parking lot outside the hotel premises to a parking lot behind the hotel. The individual 125 may track the progress of the autonomous vehicle 115 on the user device 120 as the autonomous vehicle 115 travels from the public parking lot to an assigned parking spot in the parking lot of the hotel. The individual 125 may then remotely secure the autonomous vehicle 115 overnight when the autonomous vehicle 115 stops in the parking garage, such as, for example, by issuing directives to shut down the engine of the autonomous vehicle 115, lock the doors of the autonomous vehicle 115, and arm a security system of the autonomous vehicle 115. The individual 125 may summon the autonomous vehicle 115 the following morning by issuing directives such as, for example, starting the autonomous vehicle 115, starting a climate control system of the autonomous vehicle 115, and specifying a pickup location for the autonomous vehicle 115 to travel to.

Figure 2:
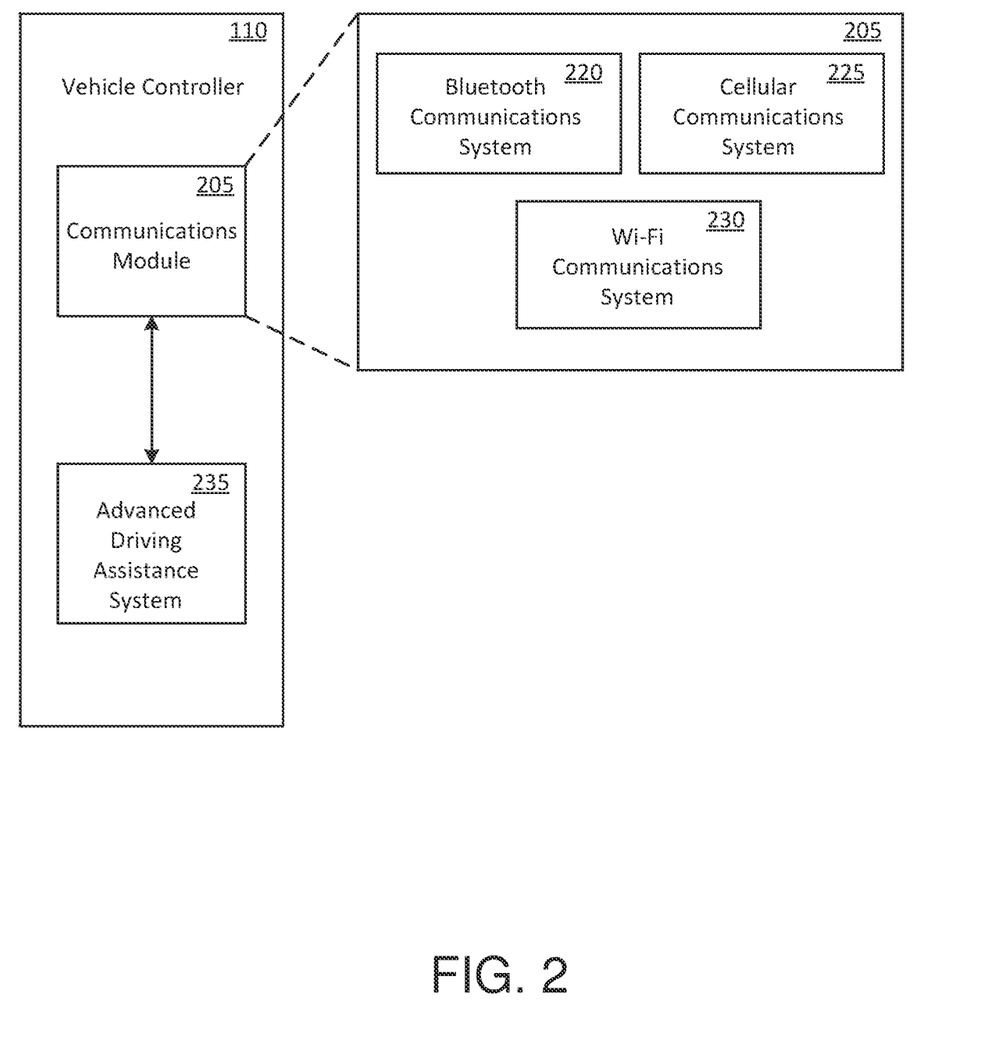
FIG. 2 shows some example components that may be included in a vehicle controller provided in an autonomous vehicle in accordance with an embodiment of the disclosure.

FIG. 2 shows some example components that may be included in the vehicle controller 110 of the autonomous vehicle 115 in accordance with an embodiment of the disclosure. The example components may include a communications module 205 and an advanced driving system (ADS) 235 that are communicatively coupled to each other. Each of the communications module 205 and the ADS 235 may include a processor, a memory, and communication hardware. The memory, which is another example of a non-transitory computer-readable medium, may be used to store an OS and various code modules such as, for example, a software application to perform various tasks, including executing directives received from the user device 120. The code modules are provided in the form of computer-executable instructions that can be executed by the processor for performing various operations in accordance with the disclosure. The memory can also contain a database for storing information such as, for example, a map of a parking lot, valid parking areas in the parking lot, prohibited parking areas in the parking lot, and travel paths in the parking lot.

The ADS 235 may provide various types of features that automate, adapt, and/or enhance various vehicle systems. The ADS 235 may, for example, automate lighting operations, provide adaptive cruise control, provide collision avoidance, provide lane departure correction, provide lane centering, and execute navigational guidance instructions. More particularly, in accordance with the disclosure, the ADS 235 is configured to execute directives received from the user device 120 via the communications module 205.

The communications module 205 may include various systems such as, for example, a Bluetooth communications system 220, a cellular communications system 225, and a Wi-Fi communications system 230 (which is one example system that employs a local wireless communication format). Each of these systems can include software and hardware such as transponders, antenna, and wireless signal interfaces. Another example of a system that may employ a local wireless communication format is a vehicle-to-everything (V2X system). In some cases, the Bluetooth communications system 220 may employ some local wireless communications format and may be used in lieu of, or in addition to, the Wi-Fi communications system 230 to execute various actions in accordance with the disclosure.

Figure 3:
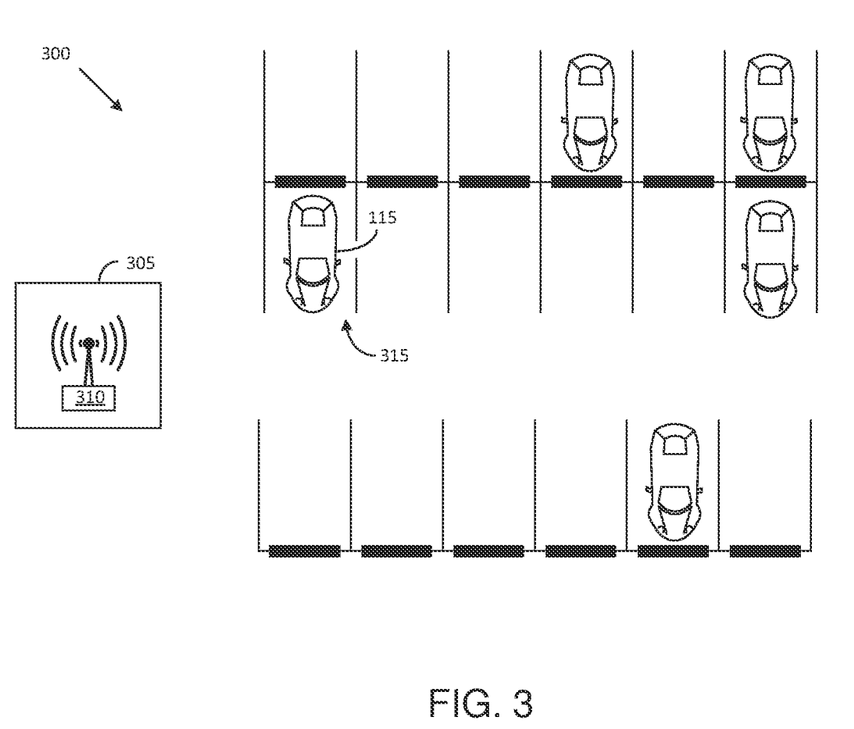
FIG. 3 illustrates an example scenario wherein an autonomous vehicle is parked in a parking area that lacks cellular coverage.

FIG. 3 illustrates an example scenario wherein the autonomous vehicle 115 is parked at a parking spot 315 in a parking area 300. The parking area 300 can be any area that lacks cellular communications coverage, such as, for example, an underground garage or a rural area. In this example scenario, the parking area 300 is a parking garage in an underground level of a multistoried structure (such as a hotel, for example) and the user device 120 used by the individual 125 is a smartphone that communicates with other communication devices via a cellular network.

The autonomous vehicle 115 may have traveled to the parking garage after the individual 125 has stepped out at a different location (in front of a reception area of a hotel, for example) and issued a directive to the vehicle controller 110 to self-park the autonomous vehicle 115 in the parking garage. Upon entering the parking garage, the autonomous vehicle 115 may have searched for a vacant parking spot and self-parked in the parking spot 315 (which may be any available parking spot or one that is reserved for hotel guests).

Cellular communication coverage is unavailable at the parking spot 315 due to various reasons such as, for example, because the parking garage is located underground and/or because the walls of the parking garage are constructed of a material that attenuates or blocks cellular signals. The cellular communications system 225 of the vehicle controller 110 therefore loses communications with the smartphone of the individual 125 at this time. The loss of communications between the vehicle controller 110 and the smartphone of the individual 125 may be irrelevant as far as the self-parking operation of the autonomous vehicle 115 in the parking spot 315 is concerned. However, the loss of communications between the vehicle controller 110 and the smartphone of the individual 125 can prevent the vehicle controller 110 receiving directives from the individual 125 (such as, for example, a summons directive to pick up the individual 125 at the front of the hotel the next day morning). The individual 125 may have checked into a room of the hotel at this time. The room may have good cellular communication coverage, thus allowing the individual 125 to use his smartphone to communicate with the cloud-based device 140 and issue directives to the vehicle controller 110 via the cloud-based device 140 in accordance with the disclosure.

The unavailability of cellular communication coverage at the parking spot 315 not only prevents the vehicle controller 110 from communicating with the smartphone of the individual 125 but also prevents the vehicle controller 110 from communicating with the cloud-based device 140 via cellular communications. However, the vehicle controller 110 may be able to communicate with the cloud-based device 140 using Wi-Fi communications as a result of availability of Wi-Fi coverage at the parking spot 315. The Wi-Fi coverage may be provided by a WiFi node such as, for example, a WiFi communications device 310 that is located in a room 305 on the underground level in the parking garage.

The cellular communications system 225 of the vehicle controller 110 includes various components that are powered by a battery of the autonomous vehicle 115. It is preferable that the cellular communications system 225 be powered down when the engine/motor of the autonomous vehicle 115 is shut down so as to reduce battery consumption. Consequently, and in accordance with the disclosure, the vehicle controller 110 may place the cellular communications system 225 in a powered down condition when the autonomous vehicle is parked at the parking spot 315 where cellular communications coverage is unavailable.

The Wi-Fi communications system 230 of the vehicle controller 110 also includes various components that are powered by the battery of the autonomous vehicle 115. In the illustrated scenario, the Wi-Fi communications system 230 may be operated by the vehicle controller 110 to communicate with the cloud-based device 140 in order to receive a directive from the smartphone of the individual 125. The directive can be issued by the individual 125 at any arbitrary time. The Wi-Fi communications system 230 can be left in a powered-up condition indefinitely so as to enable the vehicle controller 110 to receive the directive from the cloud-based device 140. However, this mode of operation may result in an unacceptable level of battery charge consumption, particularly if the autonomous vehicle 115 is left parked in the parking spot 315 for a long period of time (a week or more, for example). Consequently, and in accordance with the disclosure, the vehicle controller 110 may power down the Wi-Fi communications system 230 and utilize a wakeup routine to power up the Wi-Fi communications system 230 in a periodic manner (or sporadic manner) to check for the presence of a directive. This procedure is described below in more detail.

Figure 4:
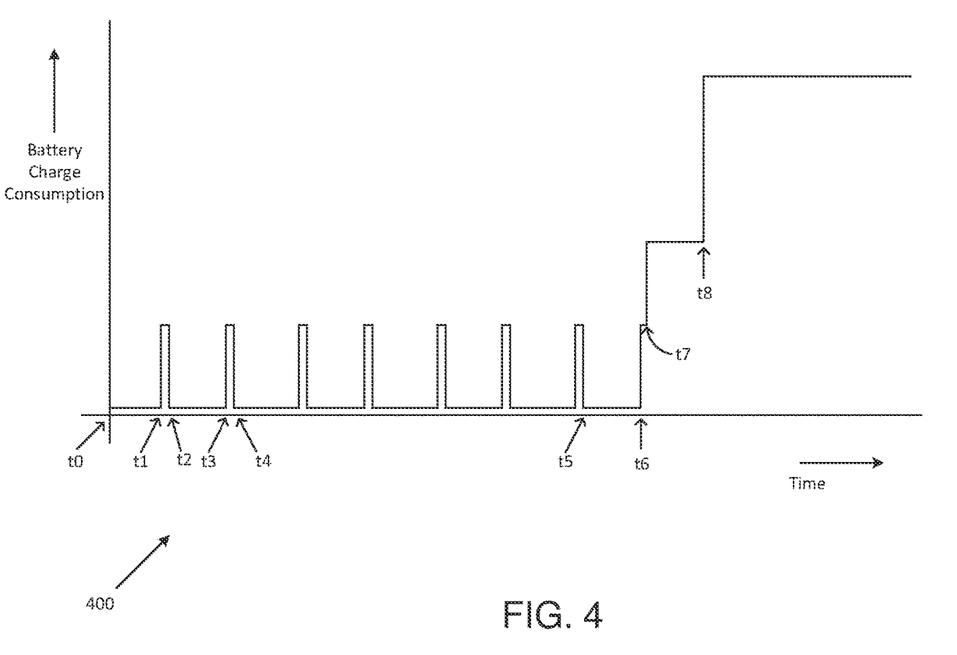
FIG. 4 shows a graph of battery power consumption in a parked autonomous vehicle in accordance with an embodiment of the disclosure.

FIG. 4 shows a graph 400 of battery power consumption in the autonomous vehicle 115 when the autonomous vehicle 115 is parked in the parking spot 315 and a wakeup routine is deployed in accordance with an embodiment of the disclosure. The vehicle controller 110 transitions to a powered-down state at time "t0" after parking in the parking spot 315. In an example implementation, the vehicle controller 110 detects the unavailability of cellular communications coverage at the parking spot 315 before transitioning to the powered-down state. In another example implementation, the vehicle controller 110 detects the unavailability of cellular communications coverage at the parking spot 315 after transitioning to a powered-up state per a wakeup routine.

The wakeup routine may be implemented by incorporating a wakeup circuit in the vehicle controller 110. A processor of the vehicle controller 110 may automatically execute the wakeup routine (in the form of a software application) during a key off condition of the autonomous vehicle 115. The software application shuts down some or all components in the vehicle controller 110 (including the communication module 205) when the autonomous vehicle 115 is first placed in the key off condition. The wakeup circuit is retained in a constantly powered-up state and operates to periodically (or sporadically) power up some of the powered-down components and place these components in an operational state. Various characteristics of the wakeup routine may be selected on the basis of a desired level of battery drain over a period of time. Some example characteristics can include a pulse repetition rate and a duty cycle of a wakeup trigger sequence used for the wakeup routine. The wakeup trigger sequence can be a periodic wakeup trigger sequence in some implementations and a sporadic wakeup trigger sequence in some other implementations in accordance with disclosure.

Other factors that may be applied to the wakeup routine is the use of different powered-up states for varying the amount of battery charge consumption at various times. For example, the wakeup routine can include a first powered-up state of the vehicle controller 110 that occurs at time "t1" where some components that were powered down (such as, for example, a radio-frequency (RF) transponder in the Wi-Fi communications system 230) are powered-up. The vehicle controller 110 operates these components during the first powered-up state (which may be referred to as a partially powered-up state) to communicate with the cloud-based device 140 to check for the presence of a directive issued by the individual 125. The communications can be limited to an exchange of a few messages between the Wi-Fi communications system 230 and the cloud-based device 140. The ADS 235 may be retained in a power down state at this time.

In the example scenario illustration by the graph 400, the vehicle controller 110 determines that no directive has been issued by the individual and at time "t2", the vehicle controller 110 transitions to a powered down state. In the powered down state, the Wi-Fi communications system 230 that had been powered up at "t1" is powered down and battery charge consumption reduced to a low level. The wake-up circuit once again initiates entry of the vehicle controller 110 into the partially powered-up state at time "t3" and communicates with the cloud-based device 140 to check for the presence of a directive issued by the individual 125. If no directive has been issued the vehicle controller 110 transitions to a powered down state at time "t4."

The wake-up routine is repeated after time "t4" in a similar manner. However, at time "t6" the vehicle controller 110 enters the partially powered-up state and recognizes that a directive has been issued by the individual 125 (a pickup summons, for example). The directive may have been issued by the individual 125 at any time after a time "t5" when the vehicle controller 110 entered a powered-down state or at any time after time "t6" when the vehicle controller 110 is in a partially powered-up state.

Any delay between issuing of the directive by the individual 125 and recognition of the directive by the vehicle controller 110 may be referred to as a directive recognition latency. The directive recognition latency may be varied by modifying a repetition rate of the wakeup routine. Increasing the repetition rate reduces the directive recognition latency but increases battery charge consumption (more frequently entering into the partially powered-up state). Conversely, decreasing the repetition rate increases the directive recognition latency but reduces battery charge consumption (less frequent entry into the partially powered-up state). Battery charge consumption may also be varied by modifying a duty cycle of the wakeup routine. Setting the duty cycle to 10%, for example, reduces battery charge consumption in comparison to setting the duty cycle to 40%, for example.

Upon recognizing that a directive has been issued, the vehicle controller 110 may transition at "t7" from the partially powered-up state to a second powered-up state (which may be referred to as a fully powered-up state) at time "t8." In the fully-powered up state, most, or all, components of the vehicle controller 110 are placed in a powered-up condition (including the ADS 235). The ADS 235 then assist in operating the autonomous vehicle 115 to execute an autonomous operation in response to the directive. For example, the ADS 235 may assist the autonomous vehicle 115 travel from the parking spot 315 to a pickup spot for picking up the individual 125 in response to a summons directive. The battery charge consumption after time "t8" will be high in comparison to the battery charge consumption during the partially powered-up condition.

Figure 5:
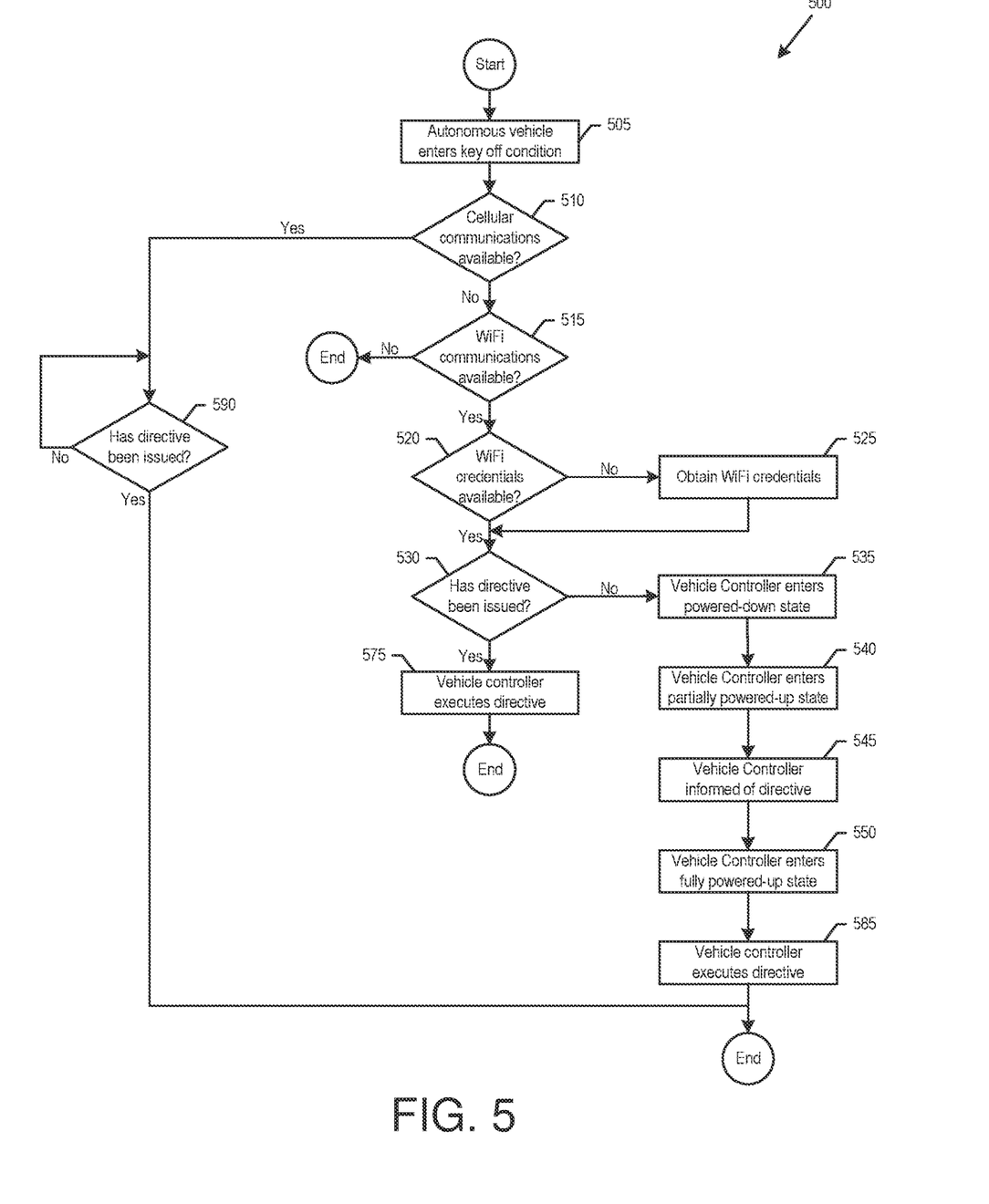
FIG. 5 shows a flowchart of a method to execute a wakeup operation upon the autonomous vehicle in accordance with an embodiment of the disclosure.

FIG. 5 shows a flowchart 500 of a method to execute a wakeup operation upon the autonomous vehicle 115 in accordance with an embodiment of the disclosure. The flowchart 500 illustrates a sequence of operations that can be implemented in hardware, software, or a combination thereof. In the context of software, the operations represent computer-executable instructions stored on one or more non-transitory computer-readable media such as a memory in the vehicle controller 110, that, when executed by one or more processors such as a processor in the vehicle controller 110, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 505, the autonomous vehicle 115 enters a key off condition. In one scenario, the key off condition may occur when the autonomous vehicle 115 executes a self-parking operation with no occupant present in the autonomous vehicle 115. In another scenario, the key off condition may occur when the autonomous vehicle 115 executes a self-parking operation and one or more occupants exit the autonomous vehicle 115.

At block 510, the vehicle controller 110 of the autonomous vehicle 115 may make a determination whether cellular communication coverage is available at a parking spot where the autonomous vehicle 115 is parked.

If cellular communication coverage is available, at block 590, the vehicle controller 110 may enter a wait state and wait for a directive that may be transmitted by the individual 125 through the user device 120 (a cellular device, such as, for example, a smartphone). If no directive is received, the vehicle controller 110 remains in the wait state. If at block 590, a directive is received, at block 585, the vehicle controller 110 executes the directive, such as, for example, by moving the autonomous vehicle 115 to a pickup spot in response to a summons directive.

If, at block 510, cellular communication coverage is not available, at block 515, the vehicle controller 110 of the autonomous vehicle 115 may make a determination whether WiFi communication coverage is available at the parking spot.

If WiFi communication coverage is not available at the parking spot, the vehicle controller 110 is unable to receive any directive from the user device 120 (directly via cellular or indirectly through the cloud-based device 140 via WiFi). Consequently, the wakeup operation illustrated in the flowchart 500 will end.

If WiFi communication coverage is available, at block 520, the vehicle controller 110 of the autonomous vehicle 115 may make a determination whether the autonomous vehicle 115 has WiFi credentials to communicate with a WiFi node (such as the WiFi communications device 310 located in the parking garage as described above). The WiFi credentials can include items such as, for example, a user name and a password.

If WiFi credentials are not available, at block 525, the vehicle controller 110 may negotiate with the WiFi communications device to obtain WiFi credentials. In an example implementation, an individual who is associated with WiFi communications device (an IT administrator or a hotel manager, for example) may provide WiFi credentials to the vehicle controller 110.

If WiFi credentials are available (either already, or newly obtained from the individual associated with WiFi communications device), at block 530, the vehicle controller 110 exchanges communications with the cloud-based device 140 (via WiFi) to inquire whether a directive has been issued by the individual 125. The communications may be carried out via messages that are efficient in various ways such as, for example, low power, short propagation time, and/or in unencoded form.

In an example scenario, the individual 125 may have issued a directive, such as, for example, a summons directive directing the autonomous vehicle 115 to travel to a pickup location at a scheduled time. The vehicle controller 110 makes note of the scheduled time, and, at block 575, executes the directive.

If no directive has been issued, the vehicle controller 110 initiates the wakeup routine described above. More particularly, at block 535, the vehicle controller 110 enters a powered-down state.

At block 540, the vehicle controller 110 enters a partially powered-up state (as a part of the wakeup routine) and operates the WiFi communications system 230 to communicate with the cloud-based device 140. The cellular communications system 225 (and ADS 235) are retained in a powered-down state at this time.

At block 545, communications between the vehicle controller 110 and the cloud-based device 140 may inform the vehicle controller 110 that a directive has been issued by the individual 125.

At block 550, the vehicle controller 110 enters a fully powered-up state by powering up elements such as the cellular communications system 225, Bluetooth communications system 220, ADS 235, etc. Additional details about the directive may be obtained by the vehicle controller 110 via messages formatted in a protocol such as, for example, FTCP or NGTP.

At block 585, the vehicle controller 110 executes the directive, such as, for example, by moving the autonomous vehicle 115 to a pickup spot designated by the individual 125 in the directive.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as a memory in the vehicle controller 110, can include any one memory element or a combination of volatile memory elements (e.g., random access memory (RAM, such as DRAM, SRAM, SDRAM, etc.) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, user devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method of operating a vehicle controller of an autonomous vehicle, the method comprising:
    detecting an unavailability of cellular communication coverage at a parking spot;
    detecting an absence or an exit of an occupant from the autonomous vehicle;
    transitioning to a powered-down state, after the autonomous vehicle is parked at the parking spot, responsive to the unavailability of cellular communication coverage at the parking spot and the absence or the exit of the occupant from the autonomous vehicle;
    transitioning to a first powered-up state per a wakeup routine;
    transmitting a query in a local wireless communication format to a cloud-based device to check for a directive to execute an autonomous operation;
    transitioning to the powered-down state upon detecting an absence of the directive;
    transitioning to a second powered-up state upon detecting the directive; and
    executing the autonomous operation after transitioning to the second powered-up state.

2. The method of claim 1, wherein the vehicle controller is configured to have a lower battery charge consumption during the first powered-up state than during the second powered-up state, responsive, at least in part, to the unavailability of cellular communication coverage at the parking spot.

3. The method of claim 1, wherein transitioning to the first powered-up state comprises powering a first component in the vehicle controller and wherein transitioning to the second powered-up state comprises powering the first component and a second component in the vehicle controller.

4. The method of claim 1, wherein a repetitive time sequence of the wakeup routine is selected to conserve power in a battery system of the autonomous vehicle when the autonomous vehicle is in a key-off condition.

5. The method of claim 1, wherein the query is a Wi-Fi query and wherein transmitting the Wi-Fi query to the cloud-based device comprises the vehicle controller establishing credentials with a Wi-Fi node prior to transmitting the Wi-Fi query.

6. The method of claim 1, further comprising:
    entering the directive into a user device of an individual; and
    transmitting the directive from the user device to the cloud-based device.

7. The method of claim 6, wherein the directive is a summons to the autonomous vehicle for picking up the individual at a designated location.

8. A method of operating a vehicle controller of an autonomous vehicle, the method comprising:
    detecting an unavailability of cellular communication coverage at a parking spot;
    detecting an absence or an exit of an occupant from the autonomous vehicle;
    transitioning to a powered-down state, after the autonomous vehicle is parked at the parking spot, responsive to the unavailability of cellular communication coverage at the parking spot and the absence or the exit of the occupant from the autonomous vehicle;
    transitioning to a first powered-up state to transmit a query in a local wireless communication format to a cloud-based device to check for a directive to execute an autonomous operation;
    transitioning to a second powered-up state upon detecting the directive; and
    executing the autonomous operation after transitioning to the second powered-up state.

9. The method of claim 8, further comprising:
    transitioning to a powered-down state when no directive is detected; and
    transitioning to the first powered-up state per a wakeup routine.

10. The method of claim 9, wherein transitioning to the powered-down state after the autonomous vehicle is parked at the parking spot comprises placing a Wi-Fi communications system and a cellular communications system in the powered-down state, and wherein transitioning to the first powered-up state per the wakeup routine comprises powering up the Wi-Fi communications system and retaining the cellular communications system in the powered-down state.

11. The method of claim 9, wherein the wakeup routine comprises a wakeup trigger sequence that is selected to conserve power in a battery system of the autonomous vehicle when the autonomous vehicle is in a key-off condition.

12. The method of claim 11, wherein the wakeup trigger sequence is one of a periodic wakeup trigger sequence or a sporadic wakeup trigger sequence.

13. The method of claim 8, further comprising:
entering the directive into a user device of an individual; and
transmitting the directive from the user device to the cloud-based device.

14. The method of claim 8, wherein the autonomous operation is one of a remote start operation, a remote vehicle door lock operation, or a remote summons operation.

15. The method of claim 8, wherein detecting the directive comprises receiving a message in the local wireless communication format, in the vehicle controller from the cloud-based device.

16. A vehicle controller of an autonomous vehicle, the vehicle controller comprising:
a memory that stores computer-executable instructions; and
a processor configured to access the memory and execute the computer-executable instructions to at least:
detect an unavailability of cellular communication coverage at a parking spot;
detect an absence or an exit of an occupant from the autonomous vehicle;
transition to a powered-down state, after the autonomous vehicle is parked at the parking spot, responsive to the unavailability of cellular communication coverage at the parking spot and the absence or the exit of the occupant from the autonomous vehicle;
transition to a first powered-up state to transmit a query in a local wireless communication format to a cloud-based device to check for a directive to execute an autonomous operation;
transition to a second powered-up state upon detecting the directive; and
execute the autonomous operation after transitioning to the second powered-up state.

17. The vehicle controller of claim 16, wherein transitioning to the powered-down state comprises placing a Wi-Fi communications system and a cellular communications system in the powered-down state, and wherein transitioning to the first powered-up state comprises powering up the Wi-Fi communications system and retaining the cellular communications system in the powered-down state.

18. The vehicle controller of claim 16, wherein the computer-executable instructions are executable to:
transition to a powered-down state when no directive is detected; and
transition to the first powered-up state per a wakeup routine.

19. The vehicle controller of claim 18, wherein the wakeup routine comprises a wakeup trigger sequence that is selected to conserve power in a battery system of the autonomous vehicle when the autonomous vehicle is in a key-off condition.

20. The vehicle controller of claim 16, wherein the autonomous operation is one of a remote start operation, a remote vehicle door lock operation, or a remote summons operation.

* * * * *